March 12, 1935. G. POTSTADA 1,994,148
COMBINATION VEGETABLE GRATER
Filed May 24, 1933
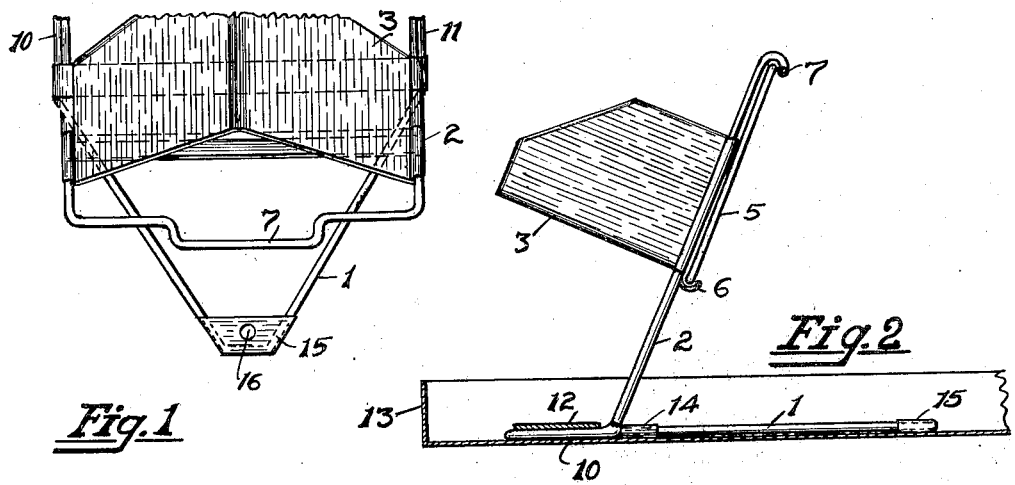
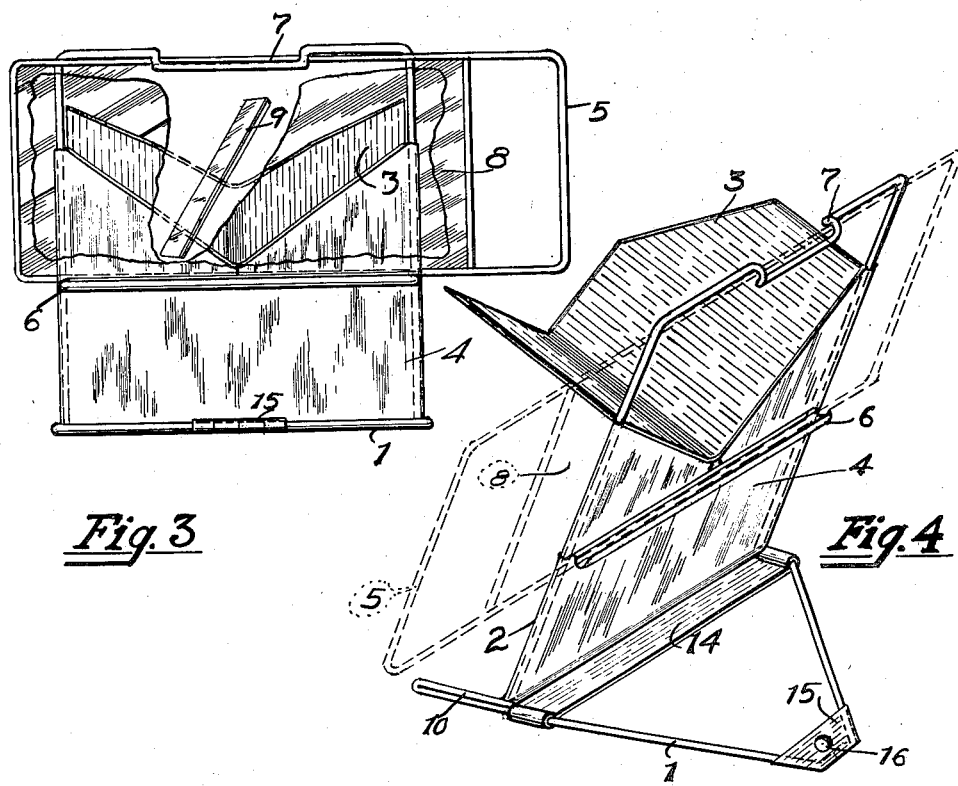
INVENTOR.
George Potstada Patented Mar. 12, 1935

1,994,148

UNITED STATES PATENT OFFICE 1,994,148

COMBINATION VEGETABLE GRATER

George Potstada, Oakland, Calif.

Application May 24, 1933, Serial No. 672,582

4 Claims. (Cl. 146—152)

This invention relates to an improvement in combination vegetable grater, the main object of which is to provide means for moving the vegetable grater instead of the vegetable, and providing for holding the vegetable, and thus preventing injury to the operator.

Another object of the invention is to provide a stand on which is a V shaped table adapted to hold the vegetables as they are pushed against the horizontal sliding grater which is reciprocated by hand, and to provide guides for the grater frame.

Another object is to provide a grater having an inclined trough for holding vegetables and provided with a guided grater at the bottom of the trough whereby the pressure required to feed the vegetable to the grater will exert a force downward on the frame which will tend to hold it in place in a pan or where used.

A further object is to provide means for holding a slidable grater consisting of various cutting or shredding surfaces which still remain toward the table adjacent the vegetable for either right or left handed use.

A still further object is that the frame is extended to the lower part in an acute angle to form a base, and this frame can be slid into loop brackets which are permanently secured to a pan, and into which the cut vegetables may drop.

An embodiment of the invention is shown in the accompanying drawing in which the same reference numeral is applied to the same portion throughout the several views and of which there may be modifications.

Figure 1 is a top view of the combination vegetable grater in accordance with my invention, some parts being broken away.

Figure 2 is a side view of the invention showing on one side the V-shaped table or trough, and the other side an upper and lower guide, the upright frame being inclined toward the lower base frame and secured to a pan.

Figure 3 is a front view of my invention showing the upper loop and the lower gutter, the inclined V-shaped table and the slidable frame having a slicing blade.

Figure 4 is a perspective view of my invention showing the wire bent to form the base which may be slipped into the bracket loop which is fastened securely to the pan.

The base 1 forms a horizontal support for the angle frame 2, and both are preferably made of wire to form as shown, and mounted on the angle frame is a V-shaped trough for holding the vegetables to be sliced or grated, the trough is set at right angles to the angle frame and is made of sheet metal. The lower portion of the angle frame 2 is preferably covered with sheet metal as shown at 4.

To receive the grater frame 5 a guideway 6 is provided, and fixed to the angle frame 2, and for a top guide for the grater frame the wire is looped over as shown at 7 to receive the top of the frame.

The grater frame consists of a sheet metal portion 8 in which are stamped the various shredding means, in this instance a slicing blade 9 is shown, but the grater forms no part of my invention except as used in my holding device.

A set of several graters should be available for each holder.

The base frame 1 has the forwarding projected members 10 and 11 which are adapted to slip into loops 12, and these loops are fixed to the bottom of a pan 13 for receiving the shredded vegetables.

The wire frame 1 is strengthened by the sheet strips 14 and 15. A hole 16 allows for hanging the frame on a nail when removed from the pan.

In operation the vegetables are placed in the V-shaped trough, and a desired form of grater is inserted in the guides and reciprocated so that the cutting face will engage the vegetables, and the grater may be used right or left handed and still face the vegetables.

From the above description it will be seen that a simple and effective device for the purpose has been evolved.

Having thus described my invention what I desire to secure by Letters Patent of the United States is as follows but modifications may be had in carrying out the invention as shown in the drawing and in the particularly described form thereof within the purview of the annexed claims.

I claim:

1. A vegetable grater of the class described, comprising a pan, loops in the bottom of said pan, a horizontal base frame having prongs adapted to engage said loops to secure said base to the pan, an upright frame set at an angle to said base, a V-shaped trough fixed to the frame and extending upward from the upper side of said frame and flush with the frame on the lower side, guides on the lower side of said frame adapted to receive a horizontally to and fro slidable grater having its grating surface adjacent the flush end of the trough whereby a vegetable placed in the trough may be grated, and the gratings fall into the pan.

2. A vegetable grater of the class described comprising a horizontal base including forwardly projecting prongs, a frame fixed to said base at an angle thereto, a trough fixed at right angles to said frame, a horizontal guide above and below the end of said trough on said frame, a grater frame adapted to slide in said guides across the end of said trough, a cutting surface in said grater frame whereby a vegetable placed in said trough may be grated.

3. A vegetable grater of the class described comprising a pan, spaced loops fixed in the bottom of said pan, a base frame adapted to set in said pan, forwardly projecting prongs on said base frame adapted to engage said loops to secure the frame to said pan, an inclined frame fixed to said base frame, a trough fixed to the inclined frame and extending from the upper side of said inclined frame and flush with the frame on the lower side, guides on the lower side of said inclined frame adapted to receive a slidable grater having its grating surface adjacent the flush end of the trough whereby a vegetable placed in said trough may be pressed against the trough and in contact with the surface of the grater.

4. A vegetable grater of the class described comprising a horizontal base, a frame fixed to said base at an angle thereto, a trough fixed at right angles to said frame, a horizontal guide above and below the end of said trough on said frame, a grater frame adapted to slide in said guides across the end of said trough, a cutting surface in said frame whereby a vegetable placed in said trough may be grated.

GEORGE POTSTADA.